3,069,385
CHAIN EXTENDING POLYCARBONATE WITH PHOSGENE

Henry C. Stevens, Akron, Ohio, assignor, by mesne assignments, to Pittsburgh Plate Glass Company
No Drawing. Filed Aug. 1, 1958, Ser. No. 752,423
16 Claims. (Cl. 260—47)

This invention deals with high molecular weight polycarbonates and more particularly concerns mixed polycarbonates derived from both aromatic diols and aliphatic diols, principally primary diols. It especially involves mixed polycarbonates derived from alkylidene diphenols and aliphatic diols.

According to this invention, mixed essentially linear high molecular weight polycarbonates having in unique orientation residues of aromatic and aliphatic diols linked by carbonate groups are provided. Such polycarbonates have as the principal (and predominant) regularly regularly repetitive structural unit:

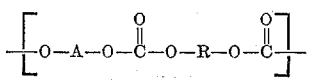

wherein A denotes the residue of an aromatic diol such as Bisphenol A (p,p′-isopropylidene diphenol) and R is the residue of an aliphatic diol, notably a primary diol. Periodically in the chain length, the repetitive regularity of this structural unit is interrupted by a carbonate linkage between two successive aromatic diol residues. Thus, in these polycarbonates the regular alternation of aromatic and aliphatic diol residues between carbonate linkages is interrupted by a diaryl carbonate residue:

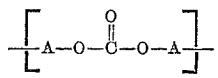

A as defined already.

Relative to the main or predominant repetitive unit of the polycarbonate, this diaryl carbonate appears only infrequently. Nevertheless, it profoundly influences the characteristics of the product.

Structurally, these polycarbonates may be regarded as comprising:

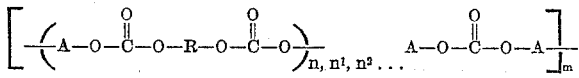

wherein A and R are as already characterized, $m$ is a value of 1 to 10 and $n, n^1, n^2$, etc, are values of 1 to 50.

As oriented in the polycarbonate, the relationship of these units may be viewed as the coupling or linking by carbonate groups of a plurality, usually 2 to 20 or more, of low molecular weight polycarbonates having available or free phenolic hydroxyl groups, notably terminal phenolic hydroxyl groups, such as:

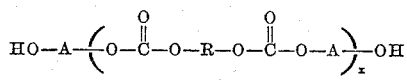

wherein $x$ is usually a value of 1 to 50, usually 5 to 35.

The term "carbonate group" herein used refers to a group having the configuration

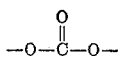

the unsatisfied valences being satisfied by residues of diols (aromatic or aliphatic as the case may be). Aromatic diol as herein used means and aromatic compound such as a benzene having phenolic hydroxyl groups, e.g., hydroxyls linked to aromatic ring carbons, such as Bisphenol A. Aliphatic diol denotes a compound having both its hydroxyl groups attached to carbon atoms of an aliphatic or cyclo-aliphatic chain. Primary diol refers to diols having each alcoholic hydroxyl group linked to a carbon atom to which two hydrogen atoms are linked, e.g., a compound having two —$CH_2OH$ groups.

In accordance herewith, these mixed higher molecular weight polycarbonates are obtained by phosgenating in the presence of base lower molecular weight mixed polycarbonates comprising alternating residues of aromatic diol and aliphatic diol linked by carbonate groups and having available phenolic hydroxyl groups. The phosgenation accomplishes chain extension by direct or indirect reactions with the phenolic hydroxyl groups thereby linearly linking those aromatic residues having phenolic hydroxyl groups through carbonate groups. Polycarbonate having terminal phenolic hydroxyl groups are chain extended with particular success and the resulting products especially noteworthy.

Only small amounts of phosgene are necessary to achieve a degree of chain extension that gives rise to polycarbonates of different properties. For example, a brittle low molecular weight polycarbonate having alternating residues of Bisphenol A and ethylene glycol is chain extended with a small amount of phosgene in the presence of base to a tough unpulverizable polycarbonate. From 0.5 to 20 percent or more phosgene by weight of the polycarbonate will provide chain extension leading to valuable products.

According to a preferred embodiment, low molecular weight mixed polycarbonates prepared by interreaction of an aromatic diol and a bishaloformate of a primary diol and having available phenolic hydroxyl groups are chain extended by phosgenation in the presence of base such as sodium hydroxide with notable ease. The resulting higher molecular weight polycarbonates are especially noteworthy, characteristically possessing valuable properties.

Reaction between aromatic diol and bishaloformate to realize these readily chain extended polycarbonates is conducted in a liquid medium with provision for chemically binding or otherwise removing evolved hydrogen halide. This is accomplished by including in the reaction medium an inorganic or organic hydrogen halide acceptor. Inorganic hydrogen halide acceptors such as sodium hydroxide, potassium hydroxide, sodium carbonate, calcium oxide or hydroxide, strontium hydroxide, barium hydroxide and the like are typical. They are principally employed in aqueous solution, or at least as an aqueous dispersion. Organic hydrogen halide acceptors include tertiary amines such as pyridine or the like which bind hydrogen halide by forming amine hydrohalide salts. These organic hydrogen halide acceptors are as a rule most effective in an anhydrous reaction.

The reaction advisedly is performed by including an inert organic solvent in the liquid medium. Water insoluble liquid organic solvents for the polycarbonate products are noteworthy, especially the partially halogenated (chlorinated) aliphatic hydrocarbons of 1 to 4 carbons including chloroform, methyl chloride, methylene chloride, ethylene chloride, beta,beta′-dichloroethyl ether, ethylidene dichloride, dichloroethylene and the dichlorobutanes. Other solvents although less preferred include the incompletely water soluble dialkyl ethers such as diethyl ether and diisopropyl ether, tetrahydrofuran, benzene and the xylenes.

The best reaction medium using inorganic hydrogen halide acceptor is one which is heterogeneous, e.g., contains essentially immiscible phases. This heterogeneity is obtained by use of water and a water insoluble organic solvent such as mentioned above. Water is conveniently added, for example, as an aqueous solution of sodium hydroxide.

Stoichiometrically, the reaction requires equimolar proportions of diol and bishaloformate. However, it is found that using between 1.05 and 1.5 moles of aromatic diol per mole of bishaloformate leads to products which polymerize most effectively upon phosgenation. Any unreacted aromatic diol may, if desired, be removed prior to polymerization by taking advantage of its water solubility in aqueous alkaline solutions.

Polycarbonates form using inorganic hydrogen halide acceptors at any convenient temperature, 0° C. to 50° C. being typical. Thus, except for economical and operational advantages, any temperature is suitable which admits of the liquid medium. It nevertheless is advisable to avoid undue solvent volatilization and/or sealed reactors as well as solidification of the reaction medium. Temperatures are chosen recognizing these considerations. Using organic hydrogen halide acceptors usually requires temperatures of 0° C. to 40° C.

The reaction itself requires two mole equivalents of hydrogen halide acceptor per mole of dihaloformate consumed, e.g., 2 moles of sodium hydroxide per mole of dihaloformate. However, for various reasons, between 2.1 and 4.0 moles of sodium hydroxide, or equivalent, per mole of dihaloformate are usual.

Chain extension of such mixed free phenolic hydroxyl containing polycarbonate is accomplished by phosgenation in the presence of a hydrogen halide acceptor. Acceptable hydrogen halide acceptors include those previously described as useful during preparation of the lower molecular weight polycarbonate. It is even possible to use the medium available after concluding reaction between aromatic diol and bishaloformate, especially when it still contains alkali such as sodium hydroxide.

It usually, however, is advisable to free the phenolic hydroxyl mixed polycarbonate of unreacted aromatic diol. Thus, in a preferred embodiment, the low molecular weight polycarbonate reaction mixture is properly refined. Frequently, phase separation of the organic solvent phase when the aqueous layer contains sodium hydroxide or like inorganic alkali provides a suitable degree of purification.

In a typical operation, phosgene (gaseous or liquid) is passed slowly into an agitated liquid body of polycarbonate and aqueous solution of inorganic alkali, e.g., sodium hydroxide. It is well to also include an inert water insoluble organic solvent, ideally an organic liquid in which both the original polycarbonate and product polycarbonate is soluble. Solvents of this character are those useful in the reaction of aromatic diol and bishaloformate. The liquid body is between 0° C. and 50° C., notably 0° C. to 30° C.

The amount of phosgene which need be introduced to achieve significant chain extension is widely variable. From about 0.5 to 20 percent, and more usually 2 to 10 percent, phosgene by weight of the polycarbonate is illustrative. For every mole of phosgene that participates in the chain extension, two mole equivalents of inorganic alkali is required. As a practical matter, an excess of inorganic alkali is usually provided, e.g., 3 to 4 or more moles of sodium hydroxide per mole of charged phosgene.

After introducing the desired quantity of phosgene, the liquid body is agitated for several hours and/or until the chloroformate chlorine disappears or becomes constant.

The following examples illustrate the manner in which this invention may be performed.

*Example I*

Bischloroformate of ethylene glycol in the amount of 1.1 moles was added to an agitated mixture of 1.0 mole of 4,4'-dihydroxy-diphenyl-2,2-propane (Bisphenol A), an aqueous sodium hydroxide solution containing 9.1 weight percent NaOH and 2.4 moles of NaOH and 900 milliliters of methylene chloride maintained at 20° C. over the course of one hour. Agitation by stirring was continued for 20 hours.

Thereafter, the organic methylene chloride layer was phase separated and water washed. After drying with magnesium sulfate, the organic layer still contained unreacted chloroformate. Additional washing with a dilute aqueous solution of pyridine-sodium hydroxide removed the residual chloroformate content, and completed the reaction.

The methylene chloride was removed by evaporation on a steam bath and finally by evacuation of the residue in a desiccator. A white, brittle, readily pulverizable polycarbonate product was obtained having a K-value of 17.5.

*Example II*

A solution of 32 grams (0.80 mole) of sodium hydroxide in 320 milliliters of water was added to 36.7 grams (0.333 mole) of resorcinol. This solution was cooled to 15° C. and 300 milliliters of methylene chloride was added. To the resulting vigorously agitated heterogeneous reaction medium at 15° C. to 20° C., 68.5 grams (0.366 mole) of bischloroformate of ethylene glycol was added over a one hour period.

From this reaction medium, a polycarbonate was recovered having a K-value of 12.5.

*Example III*

A total of 0.250 mole of ethylene glycol bischloroformate was added at an essentially uniform rate over a period of 50 minutes to a liquid medium provided by mixing 0.275 mole of Bisphenol A, 225 milliliters of methylene dichloride and 268.4 grams (0.610 mole NaOH) of aqueous sodium hydroxide solution containing 9.1 weight percent NaOH while agitating the medium and maintaining it at 15° C. to 20° C. Thereafter, the resulting medium was allowed to stand for 20 hours.

The resulting phenolic hydroxyl terminated product was recovered by phase separation of the methylene dichloride solution from the aqueous alkaline phase, diluted with methylene chloride and dried over anhydrous magnesium sulfate. From a small aliquot (50 milliliters) of this dried solution (610 milliliters), a brittle, pulverizable, low molecular weight polycarbonate product having a K-value of 24 and containing less than 0.01 weight percent chloroformate chlorine was isolated. The separated aqueous layer yielded 0.011 mole of unreacted Bisphenol A.

*Example IV*

The dried methylene chloride solution (560 milliliters) obtained in Example III (less the small aliquot) was evaporated on a steam bath to a volume of 280 milliliters. To this, 192 grams (0.48 mole) of aqueous sodium hydroxide containing 10 weight percent NaOH was added. While agitating this diluted solution and maintaining it at 15° C., 9.9 grams (0.10 mole) of gaseous phosgene was introduced in 15 minutes at an essentially uniform rate. Stirring was continued after completing the addition of phosgene for 26 hours at which time the product did not contain detectable chloroformate chlorine.

Product was recovered by acidifying the mixture with aqueous hydrochloric acid (10 weight percent HCl), phase separating, water washing the organic phase until free of chloride ion, drying over anhydrous magnesium sulfate, evaporating methylene chloride on a steam bath and then by pumping to a constant weight at 55° C. under 1 millimeter of mercury pressure. A tough polycarbonate product virtually unpulverizable directly to powder form and having a K-value of 34 was obtained.

Chain extension of mixed polycarbonates as herein described and illustrated by the examples is applicable to a wide variety of phenolic hydroxyl containing mixed polycarbonates constituted of residues of both aromatic and aliphatic diols.

Among the mixed polycarbonates are those which include residues derived from alkylidene diphenols such as:

(4,4'-dihydroxy-diphenyl)-methane
1,1-(4,4'-dihydroxy-diphenyl)-cyclohexane
2,2'-methylene bis(4-methyl-6-tertiary butyl phenol)
2,2'-methylene bis(4-ethyl-6-tertiary butyl phenol)
4,4'-butylidene bis(3-methyl-6-tertiary butyl phenol)
4,4'-thiobis(3-methyl-6-tertiary butyl phenol)
1,1-(4,4'-dihydroxy-3,3'-dimethyl-diphenyl)-cyclohexane
2,2-(2,2'-dihydroxy-4,4'-di-tert-butyl-diphenyl)-propane
3,4-(4,4'-dihydroxy-diphenyl)-hexane
1,1-(4,4'-dihydroxy-diphenyl)-1-phenyl-ethane
2,2-(4,4'-dihydroxy-diphenyl)-butane
2,2'-(4,4'-dihydroxy-diphenyl)-pentane
3,3'-(4,4'-dihydroxy-diphenyl)-pentane
2,2'-(4,4'-dihydroxy-diphenyl)-3-methyl-butane
2,2'-(4,4'-dihydroxy-diphenyl)-hexane
2,2'-(4,4'-dihydroxy-diphenyl)-4-methyl-pentane
2,2'-(4,4'-dihydroxy-diphenyl)-heptane
4,4-(4,4'-dihydroxy-diphenyl)-heptane
2,2-(4,4'-dihydroxy-diphenyl)-tridecane
2,2-bis(3,5-dichloro-4-hydroxy phenyl)-propane
2,2-bis(tetrachloro hydroxy phenyl)-propane
2,2-bis(3-chloro-4-hydroxy phenyl)-propane
2,2-bis(3,3'-dimethyl-4,4'-dihydroxy-diphenyl)-propane Other aromatic diols useful in providing the aromatic residues of the mixed polycarbonate include catechol, resorcinol, quinol, orcinol, mesorcinol, the dihydroxyxylenes such as 1,4-dimethyl, 3,5-dihydroxybenzene, thymoquinol; naphthalene diols such as 1,3-dihydroxynaphthalene, 1,4-dihydroxynaphthalene, 1,8-dihydroxynaphthalene, 2,7-dihydroxynaphthalene, 1,6-dihydroxynaphthalene; dihydroxy-diphenyls such as 2,5-dihydroxydiphenyl, 2,2'-dihydroxy-diphenyl, 2,4'-dihydroxydiphenyl, 3,3'-dihydroxydiphenyl, 4,4'-dihydroxydiphenyl, 3,4-dihydroxydiphenyl.

Mixed polycarbonates having both aromatic and aliphatic residues of diols are also contemplated wherein the aromatic residues are derived from a plurality of two or more such aromatic diols, e.g., reaction of a bishaloformate of an aliphatic diol and both Bisphenol A and catechol.

As indicated, preferred higher molecular polycarbonates produced as herein described by phosgene polymerization are those in which the residues of non-aromatic (aliphatic) diols are derived from a primary diol, or a mixture thereof. That is, polycarbonates provided by use of bishaloformate (preferably bischloroformate) of primary diols, as defined, are preferred. Typical of such diols are ethylene glycol, butanediol-1,4- propanediol-1,3, diethylene glycol, dipropylene glycol, dibutylene glycol, triethylene glycol, tetramethylene glycol as well as unsaturated dihydric alcohols such as 2-butenediol-1,4. Other primary diols, principally polyglycols having 1 to 10 ether linkages and/or up to 50 carbon atoms are useful. Also especially useful are thiodiglycol and ethylene thio-diglycol.

Aralkyl diols having primary alcoholic hydroxyl groups are also useful. These are typified by the xylylene glycols, metaxylylene glycol, phthalyl alcohol, paraxylylene glycol, dimethylxylylene glycol, alpha,alpha'-dihydroxy-durene and styryl glycol.

Although primary aliphatic diols are preferred, the chain extension and ensuing benefits are realized with mixed polycarbonates derived from non-aromatic diols other than primary diols. Among the more common diols of this character are propanediol-1,2, butanediol-1,3, butanediol-1,2, 3-butenediol-1,2, and polyglycols as well as cycloaliphatic diols such as 1,2-cyclohexanediol, 1,3-cyclohexanediol, 1,4-cyclohexanediol, 1-methyl-cyclohexanediol-2,3, 1,2-cyclopentanediol, 1,3-cyclopentanediol, 3,3'-dihydroxydicyclopentyl ether, hydrogenated bisphenols illustrated by 4,4'-dihydroxydicyclohexyl-2,2-propane and 1,2-dihydroxy-4-vinylcyclohexane.

It will be further understood that the mixed polycarbonate can be provided by reacting various mixtures of bishaloformates of aliphatic diols (diols wherein the hydroxyl groups are linked to non-aromatic carbons) with various mixtures of aromatic diols to realize phenolic hydroxyl containing polycarbonates. Usually chain extension and hence improvement in properties is most pronounced when the ratio of aromatic to aliphatic diol residues is about equal in the mixed polycarbonate (an extra aromatic residue being best to provide the terminal phenolic hydroxyl groups). Nevertheless, a mixed polycarbonate having between 10 and 90 percent of its diol residues as aromatic residues is contemplated.

Moreover, in preparing a mixed polycarbonate, it is preferred that bishaloformates of the aliphatic diols be used, although it is possible to use a bishaloformate of an aromatic diol.

Phosgene chain extension also may be accomplished with mixed polycarbonates prepared other than by reaction of bishaloformates and aromatic diol. It is applicable to mixed polycarbonates obtained, for example, by ester interchange between a diaryl carbonate such as diphenyl carbonate and a mixture of Bisphenol A and a diol such as ethylene glycol.

It may be possible to produce chain extended polycarbonates as herein contemplated by the simultaneous addition of phosgene and a bischloroformate of an aliphatic diol to an aromatic diol (e.g., Bisphenol A) in the presence of hydrogen halide acceptor while carefully controlling conditions and the ratio of reactants.

K-values reported herein were obtained by weighing 0.2500 gram of the polycarbonate into a 50 milliliter volumetric flask and then adding 25 milliliters of dioxane or meta-cresol. Gentle heating on a steam bath with some shaking is used to obtain complete solution. After cooling to 25° C. and with enough dioxane or meta-cresol to bring the level to the calibration mark on the volumetric flask, the solution is well mixed and filtered through a coarse fritted glass filter using a minimum of vacuum. The viscosity of the filtrate is determined by transferring 10 milliliters of the solution to a modified Ostwald viscosimeter which is placed in a constant temperature bath at 25° C. for 5 minutes. The efflux time at 25° C. is determined. The dioxane or meta-cresol solvent is filtered and its efflux time is determined in the same manned. The relative viscosity is the ratio of the solution efflux time to the solvent efflux time. The log of the relative viscosity is determined and the K-value to which it corresponds is formed by reference to a graph which plots the relationship between known K-values and relative viscosities.

While the present invention has been described with reference to specific details of certain embodiments, it will be understood that it is not intended that the invention be construed as limited to such details except insofar as they appear in the appended claims:

I claim:

1. The method which comprises chain extending a phenolic hydroxyl containing polycarbonate provided by reaction of aromatic diol having a pair of phenolic hydroxyl groups with bishaloformate of aliphatic diol by reacting the polycarbonate with phosgene and base.

2. A method of preparing a polycarbonate which comprises reacting phosgene and base with an organic solution of a polycarbonate formed by reaction of a bischloroformate with an aromatic diol having a pair of phenolic hydroxyl groups.

3. A method of preparing a polycarbonate which comprises reacting phosgene and hydrogen halide acceptor with an organic solution of a polycarbonate formed by reaction of a bischloroformate of an aliphatic diol with an aromatic diol having a pair of phenolic hydroxyl groups.

4. A method of chain extending a polycarbonate which comprises phosgenating a liquid mixture of aqueous sodium hydroxide solution nad an organic solution of a polycarbonate formed by reaction of bischloroformate of an aliphatic diol with an aromatic diol having a pair of phenolic hydroxyl groups.

5. A method of preparing mixed polycarbonates which comprises forming the mixed polycarbonates by reaction of bischloroformate of an aliphatic diol with aromatic diol having a pair of phenolic hydroxyl groups in a heterogeneous liquid reaction medium comprising an organic solvent for the polycarbonate and an aqueous inorganic alkali thereby obtaining mixed polycarbonate in solution in the organic solvent, adding phosgene to the organic solution, and reacting the phosgene with the mixed polycarbonate whereby to chain extend the mixed polycarbonate.

6. A method of preparing high molecular weight mixed polycarbonates which comprises forming mixed polycarbonates by reaction of a mixture containing bischloroformate of an aliphatic diol with an aromatic diol having a pair of phenolic hydroxyl groups, water, inorganic alkali and an organic solvent for the polycarbonate, and subsequent to the reaction between bischloroformate and aromatic diol adding phosgene to a mixture of base and the resulting organic polycarbonate solution thereby obtaining a polycarbonate having a molecular weight substantially greater than the molecular weight of the polycarbonate initially formed by reaction of bischloroformate and aromatic diol.

7. A linear polycarbonate polyester of (A) carbonic acid and (B) a polycarbonate ester having free phenolic hydroxyl groups of (a) an aromatic diol which contains a pair of phenolic hydroxyl groups and (b) an aliphatic bishaloformate.

8. A method of preparing a polyester which comprises reacting phosgene and a base with a mixed polycarbonate ester of an aliphatic diol and an aromatic diol containing a pair of phenolic hydroxyl groups in which the radicals of the aliphatic diol alternate with the radicals of the aromatic diol, said mixed ester containing free phenolic hydroxyl groups.

9. A method of preparing a resinous material which comprises reacting a bischloroformate of a diol with an aromatic diol having a pair of phenolic hydroxyl groups in the presence of a hydrogen chloride acceptor and thereby producing a polycarbonate ester containing free hydroxyl groups, and reacting the polycarbonate ester thus obtained with phosgene and a base.

10. The process of claim 9 wherein the aromatic diol is in stoichiometric excess of the bischloroformate.

11. An essentially linear polycarbonate ester of (A) carbonic acid and (B) a polycarbonate ester of (a) an alkylidene bisphenol and (b) an aliphatic bishaloformate said polycarbonate ester (B) containing terminal phenolic hydroxyl groups.

12. The process of claim 8 wherein the aromatic diol is an alkylidene bisphenol.

13. The method of claim 6 wherein said mixture contains between 1.05 and 1.5 moles of aromatic diol per mole of bishaloformate.

14. An essentially linear polycarbonate polyester of (A) carbonic acid and (B) a mixed polycarbonate ester having terminal phenolic hydroxyl groups of (a) an alkylidene bisphenol and (b) an aliphatic bishaloformate wherein said mixed polycarbonate ester (B) comprises alternating alkylidene bisphenol and aliphatic bishaloformate residues and wherein the polycarbonate esters of carbonic acid (A) are alkylidene bisphenol diaryl carbonate residues.

15. An essentially linear polycarbonate polyester of (A) carbonic acid and (B) a polycarbonate ester having free phenolic hydroxyl groups of (a) an aromatic diol which contains a pair of phenolic hydroxyl groups, (b) an aliphatic diol and (c) carbonic acid.

16. An essentially linear polycarbonate ester of (A) carbonic acid and (B) a polycarbonate ester of (a) an alkylidene bisphenol, (b) an aliphatic diol and (c) carbonic acid, said polycarbonate ester (B) containing terminal phenolic hydroxyl groups.

References Cited in the file of this patent

UNITED STATES PATENTS

| | | |
|---|---|---|
| 2,455,652 | Bralley et al. | Dec. 7, 1948 |
| 2,789,967 | Reynolds et al. | Apr. 23, 1957 |

FOREIGN PATENTS

| | | |
|---|---|---|
| 546,375 | Belgium | Mar. 23, 1956 |

UNITED STATES PATENT OFFICE
CERTIFICATE OF CORRECTION

Patent No. 3,069,385                      December 18, 1962

Henry C. Stevens

It is hereby certified that error appears in the above numbered patent requiring correction and that the said Letters Patent should read as corrected below.

column 1, line 19, strike out "regularly"; line 67, for "and" read -- an --; column 5, line 50, for "butanediol-1,4-" read -- butanediol-1,4, --; line 57, for "thio-diglycol" read -- thiodiglycol --; column 6, line 45, for "manned" read -- manner --; column 7, line 1, for "nad" read -- and --; line 2, before "bischloroformate" insert -- a --.

Signed and sealed this 2nd day of June 1964.

(SEAL)
Attest:

ERNEST W. SWIDER                      EDWARD J. BRENNER
Attesting Officer                       Commissioner of Patents